United States Patent [19]

Pompier

[11] Patent Number: 4,823,107
[45] Date of Patent: Apr. 18, 1989

[54] CIRCUIT AND DEVICE FOR MONITORING AND/OR MANAGEMENT OF THE OPERATING CONDITION OF A TIRE

[75] Inventor: Jean-Pierre Pompier, Enval, France

[73] Assignee: Compagnie Generale des Establissements Michelin, Clermont-Ferrand, France

[21] Appl. No.: 169,591

[22] Filed: Mar. 17, 1988

[30] Foreign Application Priority Data

Mar. 24, 1987 [FR] France ................ 87 04120

[51] Int. Cl.$^4$ ............................................. B60C 23/00
[52] U.S. Cl. ................................. 340/442; 73/146.4; 73/146.5; 116/34 R; 200/61.22
[58] Field of Search ............... 340/58, 52 R, 57, 60; 73/146, 146.4, 146.5; 116/34 R; 200/61.22

[56] References Cited

U.S. PATENT DOCUMENTS

| 2,063,452 | 12/1936 | McDonnell | 340/58 |
| 2,235,930 | 3/1941 | Huggins. | |
| 2,313,247 | 3/1943 | Krow | 340/58 |
| 3,297,984 | 1/1967 | Necker | 340/58 |
| 3,693,149 | 9/1972 | Johnston | 340/58 |
| 3,757,294 | 9/1973 | Schultz | 340/58 |
| 4,489,599 | 12/1984 | Andrei-Alexandru et al. | 73/146.5 |

Primary Examiner—Donnie L. Crosland
Attorney, Agent, or Firm—Oblon, Fisher, Spivak, McClelland & Maier

[57] ABSTRACT

A device and electric circuit mounted on a wheel of a vehicle and to transmit via bearings an electrical signal for measurement of parameters such as the pressure and temperature of the tire. The measurement is made based on the conduction state of a semiconductor element coupled to a sensor sensing the tire pressure and/or temperature. Specifically observed are three resistances of sufficient different values: the resistance of a semiconductor element in the on-state, a resistance $R_o$ two orders of magnitude greater than the preceding one and the internal resistance of at least one semiconductor element in the off-state. The sensor and circuit ar integrated in a standard valve. In one embodiment, it is possible to operate an electric element mounted on the wheel.

10 Claims, 8 Drawing Sheets

CIRCUIT AND DEVICE FOR MONITORING AND/OR MANAGEMENT OF THE OPERATING CONDITION OF A TIRE

BACKGROUND OF THE INVENTION

1. Field of the Invention

This invention relates to monitoring of tires, in particular to circuits and devices in which the transmission of an electrical monitoring signal occurs by electric conduction between the wheel and the vehicle, while transmitting sufficiently valuable information to make an effective monitoring possible.

2. Discussion of the Background

In U.S. patent application Ser. No. 07/111,349, it was proposed to provide the transmission of an electrical signal by electric conduction between a wheel of a vehicle and the vehicle itself, i.e., between the stationary space of the vehicle and the mobile space in rotation. For this purpose, at least one of two electrically conductive paths, necessary to provide the transmission of an electrical signal, passes through a vehicle bearing. However, a bearing constitutes a mechanical part through which electric conduction is not perfect. It introduces into the electric line a spurious resistance whose value cannot be controlled and which fluctuates in a rather wide range as a function particularly of heating and transmitted stresses. This poses no major problem if the electrical signal transmitted is of the "all or nothing" type. Therefore, for example, a simple pressure switch is installed on the tire.

Unfortunately a simple pressure switch does not make it possible to take sufficiently into account the operating condition of a tire. Temperature is an important parameter that must be taken into account. Further, it is desirable to be able to distinguish a slow pressure loss, which undoubtedly requires handling the tire gently, for example by driving at a slow speed, from a rapid pressure loss, which would make immediate stopping necessary.

SUMMARY OF THE INVENTION

Accordingly, one object of this invention is to provide a novel electric circuit and device using a transmission by electric conduction between the wheel and vehicle, of the type described above, which provides two conductive paths by which an electrical signal passes between the wheel and vehicle, and to adapt itself to its imperfections, while providing an effective monitoring of the operation of a tire.

Another object of this invention is to provide a novel electric circuit and device for monitoring of the operation of a tire, which outputs at least two distinct alarms; a first alarm when the operation enters a zone considered abnormal and a second alarm when the operation enters a dangerous zone.

These and other objects are achieved according to the invention by providing a novel electric circuit and device mounted on rotating elements for monitoring the operating condition of a tire by means of electrical conduction of an electrical signal between the rotating elements and the stationary space of the vehicle. To that end there is provided a conductive path including the set of electrically conductive rotating mobile elements, the bearing or bearings and the wheel carrier, and another conductive path including a conductive element passing through mechanical elements placed on the inside of the bearing or bearings. One of the paths provides the electrical connection between operating means placed in the stationary space of the vehicle and the electric circuit which is mounted on the rotating elements, the other of the paths being connected to ground of the vehicle. The electric circuit identifies and indicates when the tire pressure drops below a minimum level at which the pressure is no longer considered as normal, and further provides the checking of at least one other parameter which makes it possible to determine that operation is in a dangerous zone when it crosses a threshold associated with the other parameter. In a first variant, the electric circuit includes sensing means and signal shaping means placed between two poles, thanks to which the electric resistance seen between the two poles is very high if the pressure is greater than the minimum and if the parameter or parameters have not crossed their respective thresholds. The electric resistance is average if the pressure is less than the minimum and if the parameter or parameters have not crossed their respective thresholds, and is slight if one or the other of the parameters has crossed its respective threshold associated with it.

As above described, by high electric resistance is understood an infinite resistance, or preferably a resistance on the order presented by a semiconductor device in the off-state (transistor or thyristor or diode in the nonconductive state). For the operating reliability of such a device, it is desirable to be able to detect failures of the monitoring device itself. This is made possible if, in the state judged normal for the operation of the tire, the resistance observed is not infinite; it suffices to verify the presence of a very slight residual but not zero current. Absence of the latter, during at least a delay period will make it possible to detect an accidental interruption of the circuit.

By slight resistance is understood a zero or almost zero resistance like that presented by a semiconductor device in the on-state.

By average electric resistance is understood a resistance of an intermediate value between the values defined above, preferably greater by two orders of magnitude than the so-called slight resistance so that, after having inserted the resistance in series as seen from the terminals of the circuit and the spurious resistance due to the transmission by electric conduction, it would still be possible to distinguish the three levels defined by the electric circuit mounted on the wheel, if necessary, with the help of a time delay.

As explained above, at least one parameter besides the so-called minimum pressure is monitored. It can be either the inflation pressure and the associated threshold is a value of the pressure below this minimum, or the temperature prevailing inside the tire and the associated threshold is a maximum value of the temperature.

For most applications of monitoring of the pressure of tires, particularly in general for road vehicles, it is desirable to monitor both a second pressure threshold and a temperature threshold. Actually, the operation will be dangerous not only below a certain pressure threshold but also in case of excessive heating that can lead to serious degradation of materials constituting the tire. This level of heating can indeed be reached while having a pressure barely below the minimum and greater than the threshold of the dangerous zone (for example, when the tire is very heavily loaded), even with a pressure greater than the minimum considered in case of great stresses.

In a second embodiment, the communication circuit between the rotating elements and stationary space transmits an electric signal between the rotating elements and stationary space of the vehicle by electric conduction, using a first conductive path including the set of electrically conductive rotating mobile elements, the bearing or bearings and the wheel carrier, and a second conductive path including a conductive element going through the mechanical elements placed on the inside of the bearing or bearings, with one of the paths providing the electrical connection between operating means placed in the stationary space of the vehicle and means placed on the rotating elements, the other of the paths connected to ground of the vehicle. In this embodiment, two circuits, each including a semiconductor device are placed on the wheel between two poles and in parallel, the semiconductors being mounted so that the conducting directions are opposite to one another for each of the circuits. On the vehicle, a circuit including two branches mounted in parallel, each branch including a semiconductor device, the semiconductor devices being mounted in the opposite direction relative to one another, is connected between a conductive path and the operating means.

This circuit makes it possible to provide monitoring of the tire and/or management of the operation of the latter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
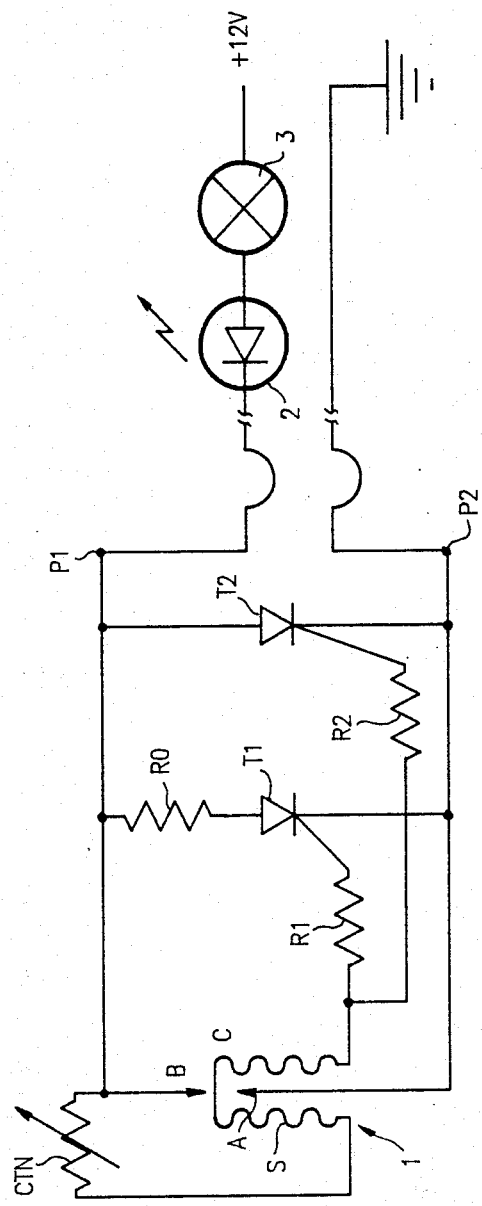
FIGS. 1 to 5 and 8 are circuit diagrams illustrating examples of circuits according to the invention.

Referring now to the drawings, wherein like reference numerals designate identical or corresponding parts throughout the several views, FIG. 1 shows a pressure switch 1 with two thresholds and a resistance CTN with negative temperature coefficient constituting the sensing means. The monitoring device provides a first alarm indicating an abnormal pressure thanks to a light-emitting diode 2 and a second alarm indicating a dangerous operation by an electric bulb 3, the diode 2 and electric bulb 3 constituting operating means mounted on the dashboard of the vehicle.

The circuit mounted on the wheel is represented to the left of poles $P_1$ and $P_2$. The operating means are connected in series, on the one hand, to the positive pole of the battery and, on the other hand, to pole $P_1$ of the circuit by a first electrically conductive path. Pole $P_2$ of the circuit is grounded on the stationary space of the vehicle by the other electrically conductive path. Between poles $P_1$ and $P_2$ are connected in parallel a branch comprising a thyristor $T_2$ and another branch comprising a thyristor $T_1$ and a resistance $R_0$, essentially constituting a signal shaping means.

The device is provided to output the second alarm when either the pressure is less than a threshold below the minimum pressure above which the pressure is normal or the temperature is greater than the maximum value. This makes it possible to monitor the tires in a very simple way while being sufficiently selective to be effective.

The pressure sensing means of pressure switch 1 includes a common pole C and two contacts A and B. Contact A and pole C are in electric contact by means of the switch when the pressure is greater than the minimum, leaving pole C floating when said pressure is less than the minimum and greater than the associated threshold. Switch 1 makes electrical contact between contact B and pole C when the pressure is less than the associated threshold. In all the figures, bellows S schematizing the pressure which is assumed to be conductive.

The circuit mounted on the wheel therefore includes a first thyristor $T_1$ whose anode is connected to the positive pole of the circuit by a resistance $R_0$ and whose cathode is connected to the negative pole $P_2$ of the circuit, and whose gate is connected to pressure sensing means by resistance $R_1$ so that resistance $R_0$ constitutes the average resistance seen between the two poles of the electric circuit when pole C is floating. The circuit includes a second thyristor $T_2$ whose anode is connected directly to pole $P_1$, the cathode to pole $P_2$, the gate by resistance $R_2$ ($R_2$ greater than $R_1$) to pressure and temperature sensing means so that the internal resistance of the second thyristor $T_2$ constitutes, when it is triggered, the slight electric resistance seen between the two poles of the electric circuit.

Any semiconductor device (transistor or thyristor) able to reverse the state of the contact between contact C and path A could be suitable for $T_1$ (that is if contact A and pole C are in closed contact, $T_1$ is in the non-conductive state, and if contact A and pole C are open, $T_1$ is in the conductive state). It is preferable that $T_2$ be a thyristor having a sudden change of state at the exact moment when the value of resistance CTN corresponds to the temperature threshold to be detected.

Light-emitting diode 2 is lit when $T_1$ is conductive, i.e., when the pressure is less than the minimum considered, and electric bulb 3 is lit when $T_2$ is conductive, therefore when the operation is judged to be dangerous, i.e., in the example considered when either the temperature is too high or the pressure is lower than the fixed threshold under the minimum normal pressure.

Figure 2:
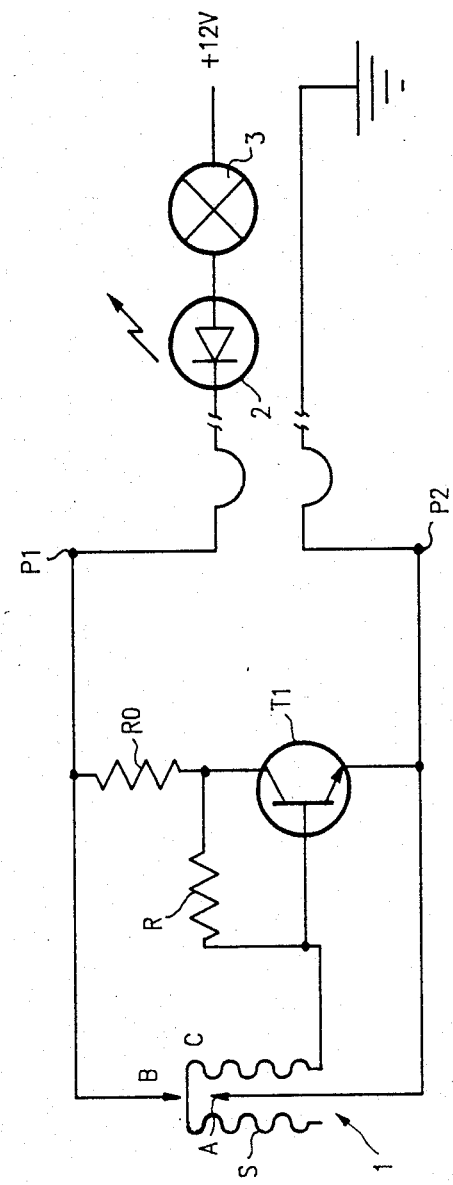

FIG. 2 illustrates an example of a circuit used to monitor the abnormal operation of the tire (pressure less than the minimum) and the dangerous operation (pressure less than a threshold) without taking the temperature into consideration. There are seen the same pressure switch 1 with two thresholds, and a transistor $T_1$ reversing the state of contact between path A and contact C to insert, between $P_1$ and $P_2$, resistance $R_0$ to constitute the average resistance when contact C is floating. The slight resistance is obtained by direct contact between contact C and path B.

Figure 3:
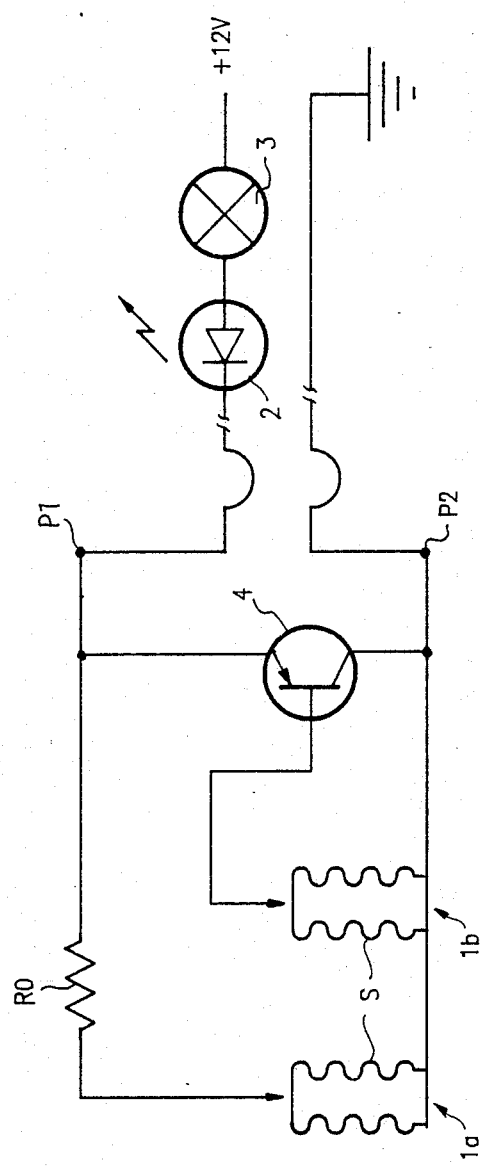

The invention can also be used with several one-way pressure switches, which makes it possible to avoid an electric reversal. In FIG. 3 is found resistance $R_0$ giving the average resistance of the circuit when the pressure has crossed a minimum, i.e., when pressure switch 1a is turned on. The slight resistance is obtained during turning on of the second pressure switch 1b. Preferably a semiconductor device 4 makes it possible to check the good operation of the common device explained above.

A second embodiment of the invention makes it possible to increase the number of parameters observed by having an additional circuit between poles $P_1$ and $P_2$, in parallel relative to the first circuit, and by subjecting this additional circuit to a voltage of the sign opposite that of the voltage applied to the first circuit.

Figure 4:
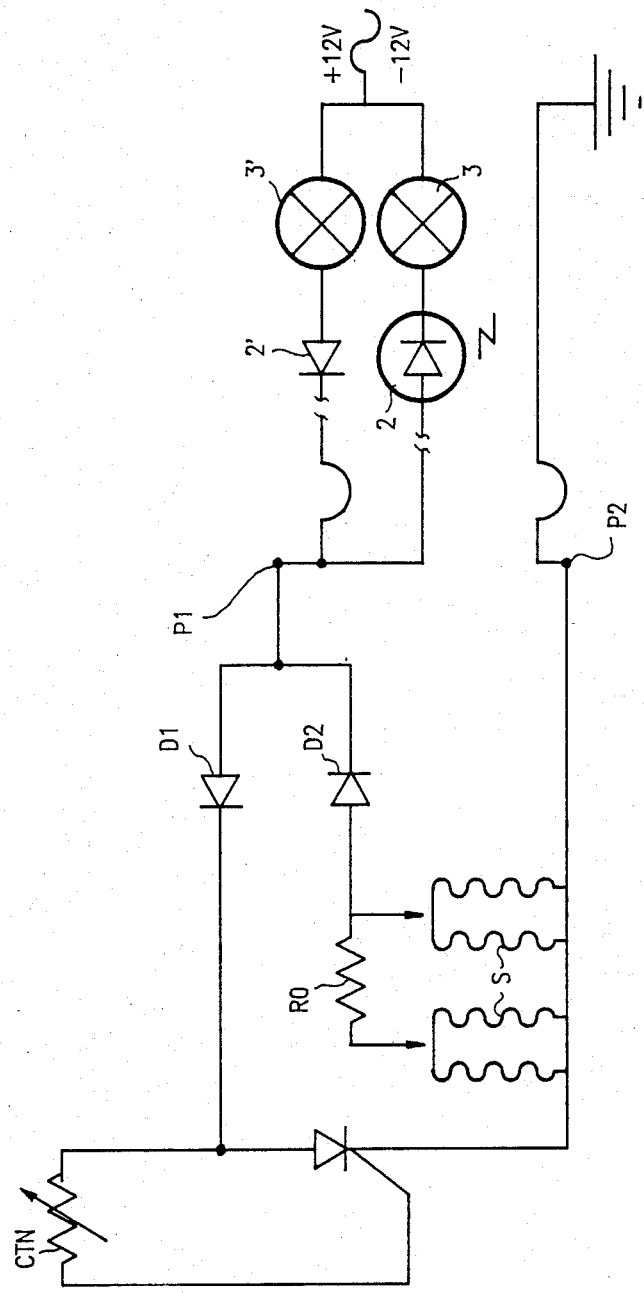

FIG. 4 shows an embodiment with an alternating voltage relative to the ground of the vehicle. Switching to one or the other group of sensing and shaping means is done by the semiconductor devices made up of diodes $D_1$ and $D_2$. Diode 2 and bulb 3 given an alarm corresponding to the sensors associated with the circuit including diode $D_2$, while bulb 3' gives an alarm only for the circuit including diode $D_1$, by the very existence of diode 2'. It is, of course, possible to increase the number of parameters observed and to use diode 2' as an alarm means according to the teaching of the present invention.

Figure 5:
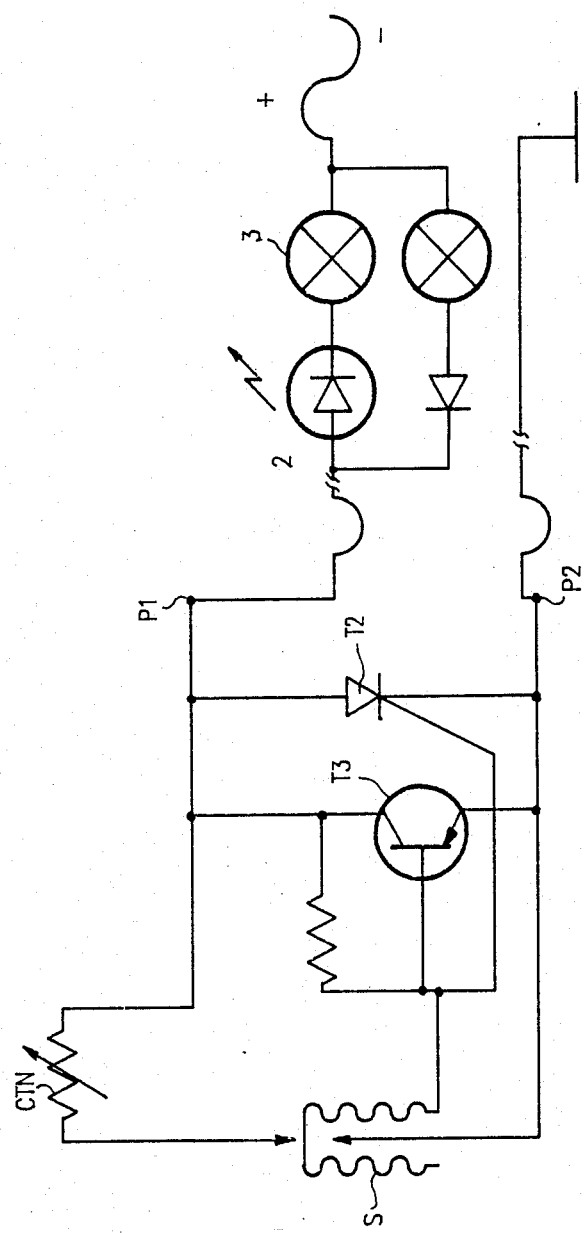

FIG. 5 shows a variant where the semiconductor device of the circuit on the wheel corresponding to alarm means 2 and 3 is a PNP transistor $T_3$ mounted with the appropriate polarity and, in addition, plays the same role as transistor $T_1$ of the circuit represented in FIG. 1. This variant makes it possible to minimize the number of components to be installed on the wheel. It should be noted that it is advantageous to use semiconductor devices acting as switches to minimize the effect of the contact resistances of a pressure switch, due, for example, to oxidation.

Figure 8:
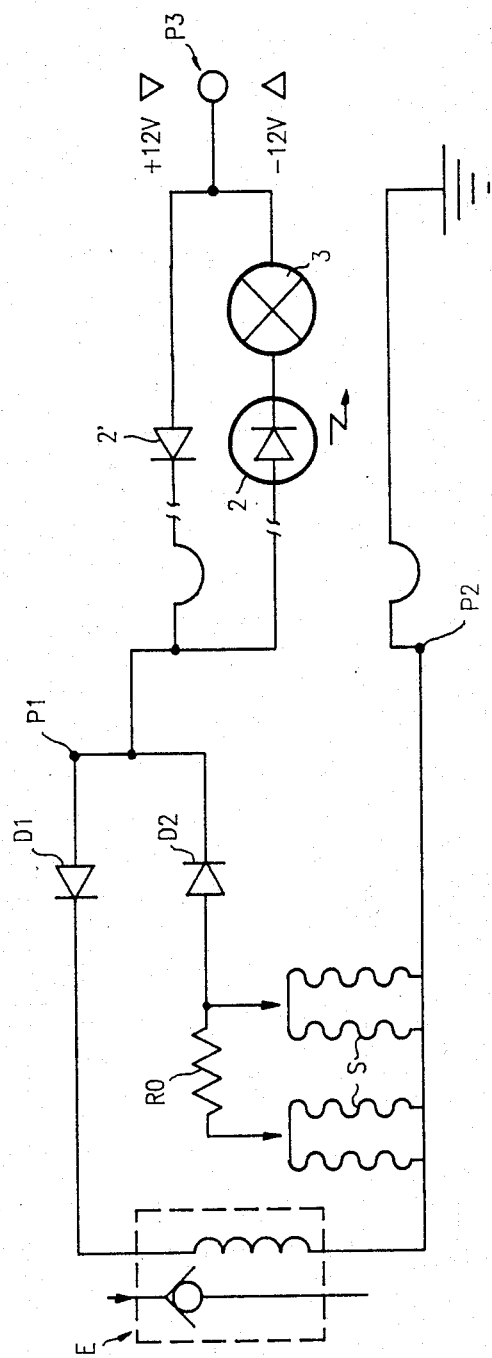

A circuit such as that of FIGS. 4 and 5 creates two electric paths in which the currents flow in opposite directions to one another. It is also possible to use one or both of these two paths to send a signal for operating a solenoid valve to provide inflation (or deflation) of the tire. The circuit is then used to provide the management of the operation of the tire. For example, in FIG. 8, a solenoid valve E can be seen. The latter is operated by applying to pole $P_3$ a positive voltage (potential greater than the ground potential) by diodes 2' and $D_1$. The other branch of the circuit mounted on the vehicle, including diodes 2 and $D_2$, is used for monitoring the tire as explained relative to FIG. 4.

Figure 6:
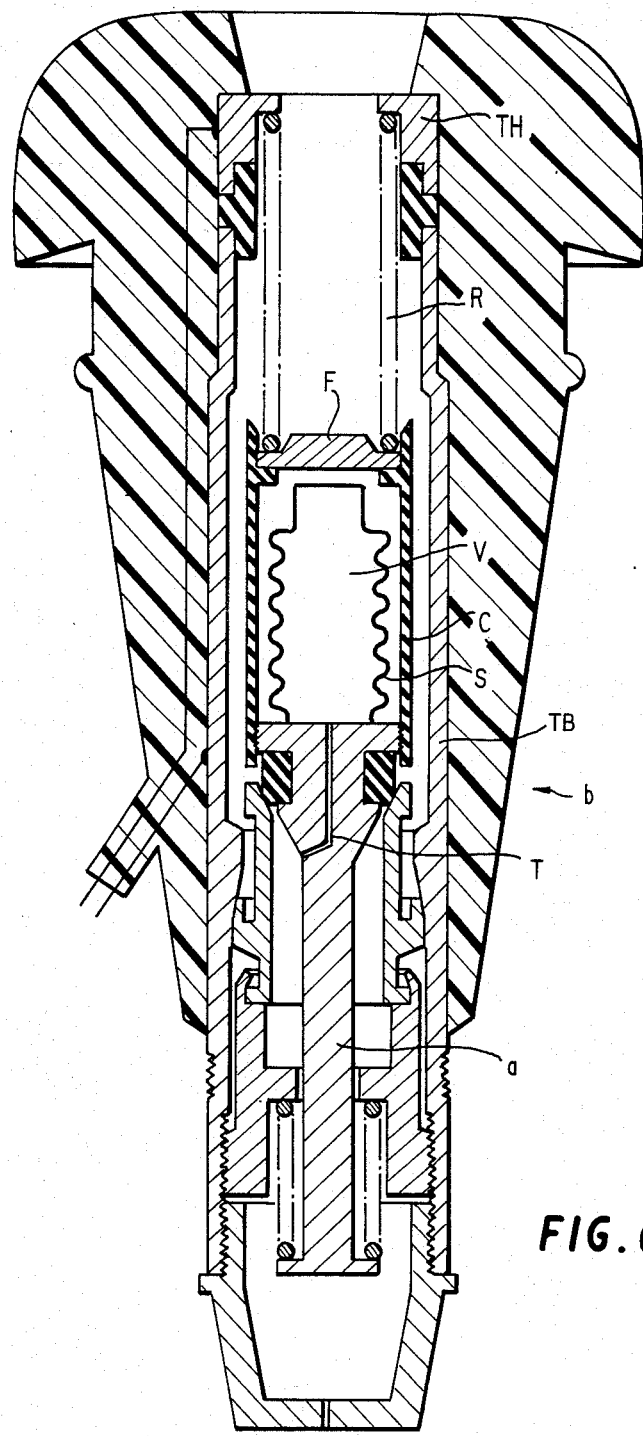
FIGS. 6 and 7 are side views illustrating pressure switches that can be used with the circuits of FIGS. 1 to 5 and 8.
Figure 7:
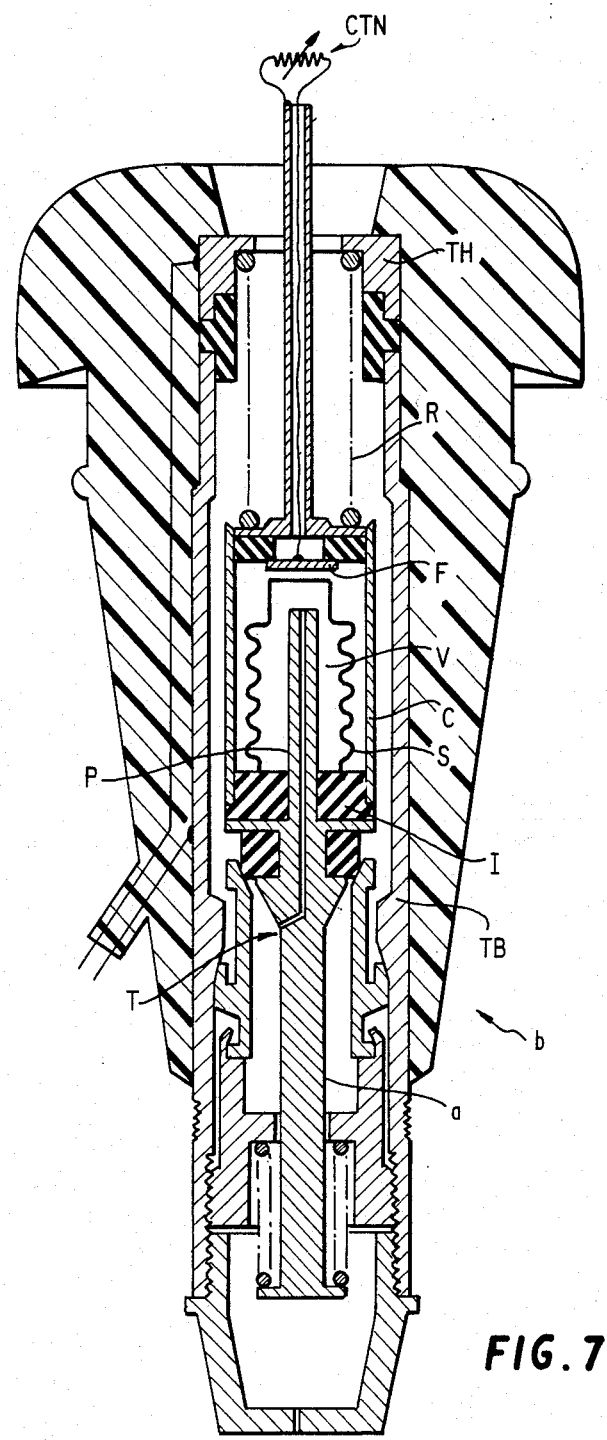

Very advantageously, the pressure switch used to monitor the pressure can be added to a clack a of a standard valve b for tires, as represented in FIGS. 6 and 7. The clack a is extended axially at its lower part by closed bellows S. The bottom of bellows S is fastened in a tight manner to clack a. Thus, in bellows S is established a volume V whose height varies with the inside pressure of the tire. To keep pressure between the inside of volume V and the outside of the volume from balancing by diffusivity, inside volume V of the bellows S is put under atmospheric pressure by a duct T made on the inside of the central rod of the clack a. Bellows S is electrically conductive.

When the pressure of the tire is insufficient, bellows S touches a plate F fastened to the base of clack a by cylinder C constituting a height adjusting device making it possible to calibrate the pressure switch.

In FIG. 6 is shown a valve b comprising a one-way pressure switch (for example, which can be used with the circuits represented in FIGS. 3 and 4). Cylinder C is made of insulating material. The tube into which clack a is screwed is made in two parts: one low part TB which receives a clack a and a high part TH, electrically insulated from the low part, on which an electrically conductive spring R rests. When clack a is screwed, spring R makes contact with plate F. Two wires soldered to two parts of the tube are buried in rubber girding valve b, and are connected to the circuit containing the signal shaping means. When bellows S comes in contact with plate F, the pressure switch is turned on.

In FIG. 7 is represented a valve b including a pressure switch that can be used for the circuit as represented in FIG. 5. It is a two-way pressure switch, and valve b further includes a resistance CTN with negative temperature coefficient, placed at the end of clack a so that it penetrates to the inside of the tire cavity, where the temperature is representative of the stresses of the tire. In this case, dismounting of clack a makes it possible to remove all the sensors. Now, this dismounting is always performed during mounting and dismounting of a tubeless tire. These mounting and dismounting operations are not affected by the presence of a monitoring device thus designed.

The pressure switch of FIG. 7 differs from that represented in FIG. 6 in that cylinder C is made of a conductive material and is extended by a tube (conductor) to which is fastened resistance CTN by one of its poles. During mounting, the cylinder C rests on spring R and therefore is in electric contact with high part TH of the tube. Plate F is fastened to the high end of cylinder C and is insulated from it. Plate F is connected to the other pole of resistance CTN. A point P is placed on the inside of bellows S to constitute the third pole of the pressure switch. Point P is electrically connected to low part TB of the tube. To avoid having to bring out a third electric connection from the valve, an insulating part I separates cylinder C from the rest of clack a. The bellows S is fastened to this insulating part I. The electric components necessary to constitute the entire electric circuit are housed in this insulating part I. It would also be possible to use such a valve with the circuit represented in FIG. 1 at the cost of some modifications of the electric connection.

The advantages of such devices are the following: there is no modification of the rim and the operation of the clack of the valve is not modified; the possibility is kept of changing the clack from the outside and replacing it with another clack whose calibration would be different; at the time of introducing air into the tire (for an inflation or a correction of pressure) an electric contact is established and the electric connection can be checked.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric circuit for monitoring of the operating condition of a tire, said circuit transmitting an electrical signal between electrically conductive rotating elements of a vehicle wheel and a stationary space of the vehicle by electric conduction by means of a first conductive path comprising the set of electrically conductive rotating elements, at least one bearing of the wheel and a wheel carrier, and by means of a second conductive path comprising a conductive element passing through mechanical elements placed on the inside of the at least one bearing, one of the paths providing an electrical connection to operation means placed on the vehicle, the other of the paths connected to a vehicle ground, said circuit identifying when tire pressure drops beneath a minimum pressure which is not considered normal and further providing an indication of at least one other parameter which makes it possible to determine that operation of said tire is in a dangerous zone when said at least one other parameter crosses a respective threshold associated therewith, said electric circuit comprising:
  a pair of poles;
  a sensing means for producing a signal indicative of said pressure and said other parameter;
  a signal shaping means coupled to said sensing means for producing an output indicative of the state of said sensing means;
  said sensing means and said signal shaping means placed between said poles; and
  said sensing means and said shaping means having an electric resistance seen between the two poles which is very high if tire pressure is greater than said minimum and if the at least one parameter has not crossed said respective threshold, said electric resistance being intermediate if the pressure is less than said minimum and if said at least one other parameter has not crossed said respective threshold, and said electric resistance being slight if said at least one other parameter has crossed said respective threshold.

2. A circuit according to claim 1, wherein said at least one other parameter is the pressure and the associated threshold is a value of the pressure less than said minimum normal pressure.

3. A circuit according to claim 2, wherein the sensing means comprises a pressure switch having a common pole C and two contacts A and B, said pressure switch putting contact A and pole C in electric contact when the tire pressure is greater than said minimum, leaving pole C floating when the tire pressure is less than said minimum but greater than said respective threshold, and putting contact B and pole C in electric contact when the tire pressure is less than said respective threshold.

4. A circuit according to claim 3, wherein said signal shaping means comprises:
  a semiconductor device which reverses the state of electric contact between contact A and pole C, said semiconductor device having an anode connected to a positive one of said pair of poles by a resistance $R_0$, a cathode connected to a negative pole of said pair of poles and a control electrode connected to said sensing means so that resistance $R_0$ constitutes the average resistance seen between the pair of poles of said electric circuit.

5. A circuit according to claim 1, wherein said at least one other parameter is temperature, and the respective threshold is a maximum value of said temperature.

6. A circuit according to claim 2, wherein said at least one other parameter is temperature, and the respective threshold is a maximum value of said temperature.

7. A circuit according to claim 5, wherein said sensing means comprises a negative temperature coefficient variable resistance connected to the control electrode of said semiconductor device, the anode and cathode of which are further connected to said poles so that, when the temperature goes beyond the threshold, said semiconductor device changes from a non-conducting to a conducting state.

8. A circuit according to claim 2, wherein said sensing means comprises a negative temperature coefficient variable resistance connected to the control electrode of said semiconductor device, the anode and cathode of which are further connected to said poles so that, when the temperature goes beyond the threshold, said semiconductor device changes from a non-conducting to a conducting state.

9. In an automobile having a tire mounted on a wheel and, coupled to a stationary space of said automobile by means of electrically conductive mobile rotating elements, a device for communication between the rotating elements and the stationary space, said device including a circuit transmitting an electrical signal between said rotating elements and the stationary space of the vehicle by electric conduction by means of a first conductive path comprising the set of electrically conductive mobile rotating elements, at least one wheel bearing, and a first wheel carrier, and by means of a second conductive path comprising a conductive element passing through mechanical elements placed on the inside of the at least one bearing, one of the paths providing an electrical connection between operation means placed in the stationary space and means placed on the rotating elements, the other of the paths connected to a vehicle ground, said device comprising, on the rotating elements, two circuit branches, each including a semiconductor device, placed in parallel on the wheel between the pair of poles, said semiconductor devices being mounted so that the conducting directions thereof are opposite to one another for each of said circuit branches, said device further comprising, on the stationary space, two circuit branches mounted in parallel and connected to the operation means, each circuit branch comprising a semiconductor device, said semiconductor devices of said circuit branches being mounted in opposite directions relative to one another.

10. A device according to claim 10, further comprising:
  a pressure switch integrated in a clack of a valve, said pressure switch comprising a bellows fastened to an end axially inside said clack, said bellows having an inside volume maintained at atmospheric pressure by means of a duct provided on an inside of a central line of said clack.

* * * * *